March 21, 1967      W. FOX      3,310,328

CLOSURE MEANS FOR PRESSURE OR VACUUM

Filed Dec. 15, 1964

3,310,328
CLOSURE MEANS FOR PRESSURE OR VACUUM
Wilfred Fox, Rotherham, England, assignor to Robert Jenkins & Company Limited, Rotherham, England, a company of Great Britain and Northern Ireland
Filed Dec. 15, 1964, Ser. No. 418,488
5 Claims. (Cl. 292—256.6)

The invention relates to closure means for pressure or vacuum vessels of the kind in which a body and closure member therefor are provided with outwardly extending flanges and said flanges are clamped together by means of a clamping ring provided with inwardly extending flanges adapted to lie in clamping engagement with remote faces of the flanges of the body and closure member respectively, at least one of the flanges of the clamping ring being discontinuous so as to form a series of spaced inwardly extending tongues capable, when the ring has been rotated slightly relative to the body and closure member of passing through similarly spaced gaps formed in one or the other flanges of the body and closure member, to permit opening movement of said closure member. The invention has for its object to provide an improvement in such closure means.

According to the invention, closure means for a pressure or vacuum vessel of the kind referred to include a clamping ring having a series of clamps secured to said ring in a manner permitting movement of individual clamps relative to the remaining clamps, each of said clamps beng provided with a pair of flanges extending inwardly of the clamping ring and said clamps together thereby providing a pair of spaced and discontinuous flanges extending inwardly of said ring. Preferably, each clamp is secured to the ring by one or more bolts. Preferably, also, the bolts extend through lugs with which the clamps are provided and through said ring. The clamping ring is preferably formed in two semi-circular sections joined together. Preferably, also, the cross section through said ring is of H or channel section.

Figure 1:
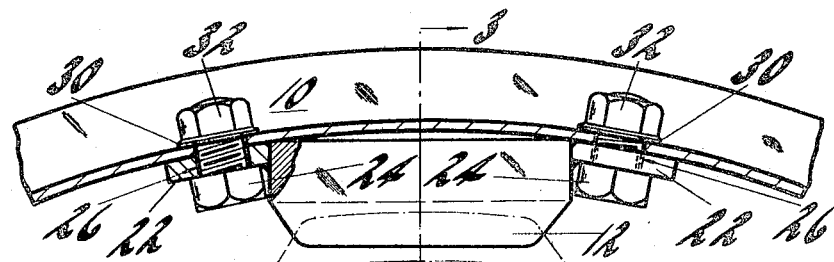
Figure 2:
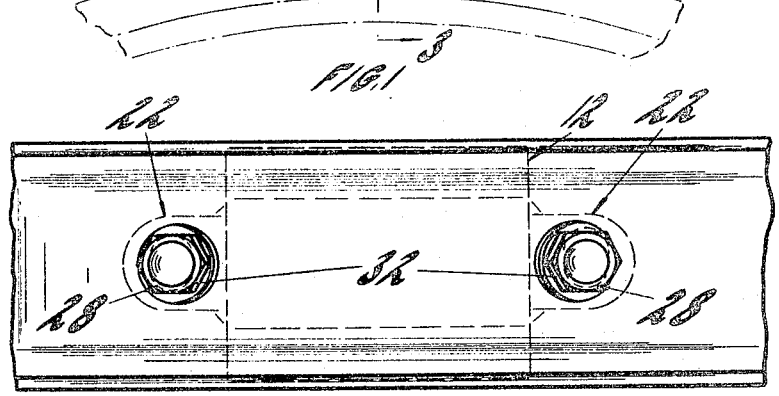
Figure 3:
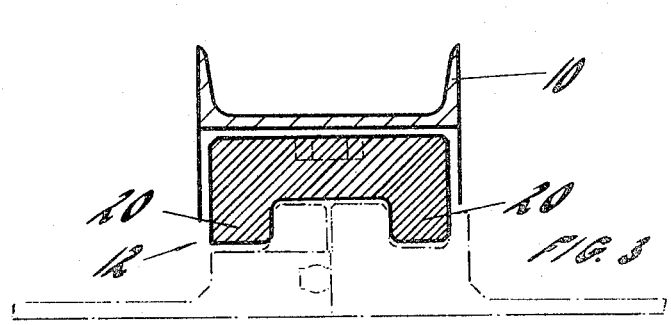
Figure 4:
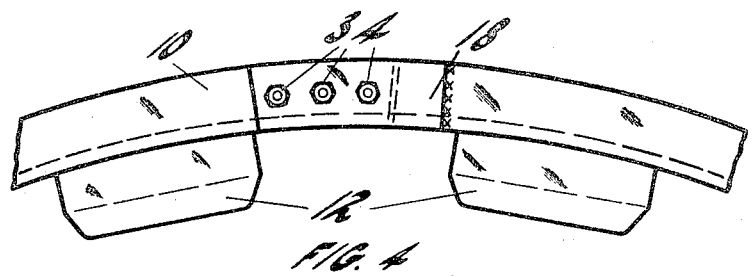

In order that the invention may be fully understood and readily carried into effect, a preferred embodiment thereof will now be described, by way of example only, with reference to the accompanying drawings of which:

FIG. 1 is an end elevation of a portion of a clamping ring embodying the invention, FIG. 2 is a plan view of said portion, FIG. 3 is a sectional view on the line 3—3 in FIG. 1, and FIG. 4 is an end view of a somewhat larger portion of the ring drawn on a somewhat smaller scale.

Referring now to the drawings, closure means for a pressure vessel of the kind referred to include a clamping ring 10 having a series of clamps 12 secured thereto. As shown in FIG. 3, a cross section through the clamping ring 10 is of channel section, and it is made in two semi-circular rolled sections joined together by means of straps 18. Said straps are each welded to one section and bolted to the other by means of bolts 34.

Each clamp 12 is provided with a pair of flanges 20 and is secured to the clamping ring 10 so that said flanges extend radially inwards thereof and so that all the clamps together provide a pair of spaced and discontinuous flanges which extend inwardly of said ring at the respective ends thereof.

The clamps 12 are each provided with lugs 22 and are secured to the clamping ring 10 by means of bolts 24 which extend through holes 26 in said lugs and through holes 28 in the clamping ring, and said holes 28 are elongated in a direction axial of the ring. Washers 30 and nuts 32, which are tightened with only moderate pressure, co-operate with the bolts 24 in securing the clamps in position.

The arrangement is such that when the clamping ring is employed to clamp together a pair of flanges (such as are shown in chain dotted lines in FIGS. 1 and 3 and which are provided on a pressure or vacuum vessel and a closure member therefor respectively) individual clamps 12 are permitted to move relative to the remaining clamps so that they may seat effectively against said flanges, each clamp taking a fair share of the clamping load. The movement referred to may occur during assembly or during service and may only be of the order of a few thousandths of an inch, but this has been found sufficient to minimise or completely avoid difficulties which have been caused when such clamps have been rigidly secured to the clamping ring, as by welding, and said ring has warped slightly either during manufacture or during service.

Various modifications may be made without departing from the scope of the invention. For example, the clamping ring need not necessarily be made in two semi-circular sections. It could be made as a one-piece member, or indeed it could be made in more than two sections if desired. It will also be understood that the clamps need not necessarily be bolted to the clamping ring; it is merely necessary for said clamps to be connected to the ring in a manner which will allow the clamps to be moved into clamping relation with a discontinuous flange of a pressure or vacuum vessel and will allow their individual "bedding-in" movement. Furthermore, the invention may be applied to a pressure vessel having a closure member contained within the vessel, inwardly extending flanges on the vessel and closure member being clamped together by means of a clamping ring having outwardly extending flanges.

It will also be understood that the pair of flanges which extend inwardly from each clamp may each be of the same size, as shown in the drawings, or one may extend radially inwards of the clamping ring to a greater distance than the other in order that it can engage an outwardly extending flange of smaller diameter than the other. Masking plates in the form of annular discs may be tack welded to the end faces or the inner curved surface of the ring 10, if desired, the internal diameters of said rings being such that the discontinuous form of the flanges is at least partly concealed from view and its appearance is thus improved.

It will be understood that the clamping ring may have any desired cross section other than channel section, for example H section or inverted T section, and that it may be a fabricated construction if desired.

What I claim is:

1. In a pressure or vacuum vessel, closure securing means comprising a substantially rigid clamping ring; a series of clamps secured non-rigidly to said ring; and flanges formed integrally with said clamps and extending inwardly of the clamping ring, whereby said flanges form pairs of spaced and discontinuous flanges extending inwardly of the clamping ring for respectively engaging and applying a clamping force to remote faces of correspondingly spaced, mating flanges which are formed on a body part and a closure member of the vessel.

2. In a pressure or vacuum vessel, closure securing means comprising a substantially rigid clamping ring; a series of clamps; a plurality of bolts for securing said clamps non-rigidly to said ring; and flanges formed integrally with said clamps and extending inwardly of the clamping ring, whereby said flanges form pairs of spaced and discontinuous flanges extending inwardly of the clamping ring for respectively engaging and applying a clamping force to remote faces of correspondingly spaced, mating flanges which are formed on a body part and a closure member of the vessel.

3. In a pressure or vacuum vessel, closure securing means comprising a substantially rigid clamping ring, said clamping ring having a plurality of holes which are elongate in a direction axial of the ring; a series of clamps; a plurality of bolts extending through said holes for securing said clamps non-rigidly to said ring; and flanges formed integrally with said clamps and extending inwardly of the clamping ring, whereby said flanges form pairs of spaced and discontinuous flanges extending inwardly of the clamping ring for respectively engaging and applying a clamping force to remote faces of correspondingly spaced, mating flanges which are formed on a body part and a closure member of the vessel.

4. In a pressure or vacuum vessel, closure securing means comprising a substantially rigid clamping ring having a plurality of holes which are elongate in a direction axial of the ring; a series of clamps; respective pairs of lugs formed integrally with said clamps; a plurality of bolts extending through said holes and through said lugs for securing said clamps non-rigidly to said ring; and flanges formed integrally with said clamps and extending inwardly of the clamping ring, whereby said flanges form pairs of spaced and discontinuous flanges extending inwardly of the clamping ring for respectively engaging and applying a clamping force to remote faces of correspondingly spaced, mating flanges which are formed on a body part and a closure member of the vessel.

5. In a pressure or vacuum vessel, closure securing means comprising a substantially rigid clamping ring made in two semi-circular halves joined together, a cross section through either half being of substantially channel section, said clamping ring having a plurality of holes which are elongate in a direction axial of the ring; a series of clamps; respective pairs of lugs formed integrally with said clamps; a plurality of bolts extending through said holes and through said lugs for securing said clamps non-rigidly to said ring; and flanges formed integrally with said clamps and extending inwardly of the clamping ring, whereby said flanges form pairs of spaced and discontinuous flanges extending inwardly of the clamping ring for respectively engaging and applying a clamping force to remote faces of correspondingly spaced, mating flanges which are formed on a body part and a closure member of the vessel.

References Cited by the Examiner

UNITED STATES PATENTS

| | | | |
|---|---|---|---|
| 2,025,113 | 12/1935 | Laurent | 285—401 X |
| 2,355,150 | 8/1944 | De Simone | 220—85 |

FOREIGN PATENTS 1,202,768    7/1959    France.

EDWARD C. ALLEN, *Primary Examiner.*

R. E. MOORE, *Assistant Examiner.*